(12) United States Patent
Woolf et al.

(10) Patent No.: US 10,107,415 B1
(45) Date of Patent: Oct. 23, 2018

(54) ANTI-BACKLASH VALVE POSITIONER

(71) Applicant: Flowserve Management Company, Irving, TX (US)

(72) Inventors: Kent Woolf, Springville, UT (US); Kenneth Beatty, Spanish Fork, UT (US); Brent Andrew Lingwall, Spanish Fork, UT (US); Michael P. Yost, Santaquin, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 15/810,865

(22) Filed: Nov. 13, 2017

(51) Int. Cl.
*F16K 37/00* (2006.01)
*F16K 5/10* (2006.01)

(52) U.S. Cl.
CPC ............ *F16K 37/0033* (2013.01); *F16K 5/10* (2013.01); *F16K 37/0041* (2013.01); *Y10T 137/8242* (2015.04)

(58) Field of Classification Search
CPC .... F16K 37/0033; F16K 37/0041; F16K 5/10; F16K 37/0025; Y10T 137/8242
USPC ..................... 137/554; 251/65, 337
See application file for complete search history.

(56) References Cited

U.S. PATENT DOCUMENTS

| | | | | |
|---|---|---|---|---|
| 7,032,617 B2* | 4/2006 | Kurita | ................. | F02D 9/105 |
| | | | | 137/554 |
| 8,474,790 B2* | 7/2013 | Uda | ................. | F16K 31/043 |
| | | | | 251/129.12 |
| 2009/0206290 A1* | 8/2009 | Wygnanski | ............ | F16K 3/262 |
| | | | | 251/129.15 |
| 2013/0255802 A1* | 10/2013 | Minnock | ............... | E21B 34/045 |
| | | | | 137/554 |

* cited by examiner

*Primary Examiner* — John Bastianelli
(74) *Attorney, Agent, or Firm* — Maine Cernota & Rardin

(57) ABSTRACT

A valve positioner monitors a valve stem position by remotely sensing a magnet attached to a coupler shaft that does not penetrate a sealed enclosure surrounding the positioner. A torsion spring, which can be helical or spiral, concentrically surrounds the shaft and is fixed to the shaft and frictionally coupled to a fixed surface by a clutch ring that coaxially surrounds the spring and is vertically pressed against the fixed surface. The torsion spring thereby suppresses backlash, vibration, and chatter by maintaining a torsional force on the shaft. The clutch ring can include a notch or slot cooperative with a key tab rotationally fixed to the coupler shaft so as to limit a range of rotation of the coupler shaft. The positioner is rendered compact by the concentric arrangement of its elements, so that embodiments can be used in place of legacy positioners.

9 Claims, 6 Drawing Sheets

ANTI-BACKLASH VALVE POSITIONER

FIELD OF THE INVENTION

The invention relates to valve control systems, and more particularly, to valve positioners.

BACKGROUND OF THE INVENTION

The operation of a control valve involves positioning a plug relative to a stationary seat within the valve, whereby an actuator that is directly coupled to the valve plug via a stem is used to move the valve plug to the desired control position. The action of the valve stem can be either linear or rotary, depending on whether the valve is a liner or rotary valve.

Typically, for an automatically controlled valve, a pneumatic or electric actuator is used to manipulate the valve stem. In either case, the actuator is operated by a control device such as a computer, controller, PLC, thermostat, and/or other electrical controlling device, all of which are referred to herein generically as a "controller," that sends an electrical control signal to an electro-mechanical or electro-pneumatic device that operates the actuator.

By automating a valve in this manner, the valve can be located in a remote, dangerous, flammable, and/or toxic environment, and/or in a location that is difficult to reach. Such valves are often used to directly and/or indirectly control temperatures, pressures, and flows within an open or closed-loop system. Heat exchangers are a common type of closed-loop control application where both pneumatically and electrically actuated control valves can be used to regulate water, steam and condensate.

Regulation of an automatically controlled valve can sometimes be implemented by monitoring the flow rate through the valve and/or other process parameters, and adjusting the valve position until the desired process parameters are achieved. However, as modern systems have continued to demand higher efficiencies, the need has increased for improved control valve performance, often demanding fast response and accuracies within 2% of set point. One approach is to include a valve positioner as part of the control system. A valve positioner is a device that provides direct feedback to the valve controller as to the positioning of the valve stem. This allows the controller to accurately control the valve, and to correct for errors due for example to mechanical wear or dimensional changes in mechanical linkages caused by temperature and pressure fluctuations.

Generally, a valve positioner includes a valve coupler that is mechanically linked to the valve stem or actuator, and is sensitive to the position of the stem. The valve positioner is coupled to a sensor that senses the position and/or movements of the valve coupler and thereby determines the position of the valve stem, and an electronic interface that transmits information regarding the valve stem position to the valve controller.

Some of the advantages of using valve positioners include:
- faster speed of response, as compared to monitoring process parameters;
- accurate control when high and/or varying differential pressures across the valve plug cause the valve position to change;
- facilitation of control action change: while the use of a positioner cannot change a valve's function, it can switch its control action, for example from direct to reverse and vise-versa;
- change of a control valve's flow characteristic, such as linearization of a non-linear flow characteristic by switching a mechanical cam or by digitally or electronically reprogramming a new performance curve into the positioner;
- improved safety, by ensuring that a valve does not travel beyond its design/safety limits; and
- improved digital communications and diagnostics capability when the positioner is interfaced, e.g. to a control systems that utilizes digital communications such as HART, BACnet, Modbus or LonWorks protocols.

While the feedback provided by a valve positioner leads to many benefits, the accuracy of the valve position sensing can be limited by backlash in the mechanical valve coupler of the valve positioner. Accordingly, valve couplers sometimes include an anti-backlash feature that maintains the moving parts of the valve coupler under tension, so that backlash is avoided.

In addition, the valve coupler is typically operable only over a limited range of motion, such that it is often desirable to be able to adapt the range of motion of the valve coupler to the configuration of the valve stem or actuator. However, alignment of the valve coupler can lead to misalignment of the sensor and/or incorrect tensioning of the anti-backlash feature. For this reason, it is often desirable to interpose a friction clutch between the valve coupler and the sensor and/or anti-backlash feature.

FIG. 1A is an exploded view of a prior art valve coupler that includes a rotatable shaft 10 that frictionally engaged at its distal end to a gear 12 which is operable over a limited range of about 75 degrees of rotation. The frictional engagement is by means of a clutch 14 formed as a stack of washers 14 that are pressed together. The gear 12 engages with a mechanically driven sensor (not shown) that is in electronic communication with the electronic interface (not shown).

A helical torsion spring 16 is provided as an anti-backlash feature. A proximal end 18 of the spring 16 is fixed to the housing, and a distal end of the spring 20 is fixed to the gear 12. Accordingly, the rotational position of the shaft 10 can be adjusted by frictional sliding of the clutch 14, while the tensioning of the spring 16 remains unaffected. If an attempt should be made to rotate the shaft 10 beyond its operating limits, the clutch 14 will function to protect the gear 12, sensor, and spring 16 from damage by allowing the shaft 10 to rotate while the gear 12 remains fixed.

Since automated valves that utilize valve positioners are often located in harsh, dirty, corrosive, flammable, and/or toxic environments, it can be desirable to surround the electronic interface of the positioner by a sealed enclosure, so that the interface is not subjected to environmental attack, and so that flammable vapors in the surrounding environment cannot reach the electronics of the interface, where they might be ignited by an electrical spark or other electronic activity of the interface. The valve coupler 10 of FIG. 1A penetrates the housing (not shown) at the indicated plane 22, so that the gear 12, clutch rings 14, and spring 16 are within the housing. A seal (not shown) is provided that allows the shaft 10 to enter the interface enclosure while excluding leakage of surrounding gasses and vapors into the enclosure.

However, this penetration of the interface enclosure and need for a seal increases the maintenance requirements of the positioner, and poses a danger of leakage of gasses past the seal, whereby the electronic interface might be corroded and damaged, and/or ambient flammable vapors might be ignited.

One approach is to use a magnetic coupling between the valve coupler and the sensor, such that the position and/or movements of the valve coupler are sensed magnetically, without requiring physical penetration of the interface housing. However, due to the limited space that is available in the region of the valve coupler outside of the interface enclosure, this approach typically does not allow for implementation of an anti-backlash feature and/or clutch.

What is needed, therefore, is a valve positioner that includes an anti-backlash feature and clutch, and yet does not require penetration of the sealed interface enclosure by the valve coupler.

SUMMARY OF THE INVENTION

A valve positioner is disclosed that includes an anti-backlash feature and a clutch, in combination with a sealed interface enclosure that is not penetrated by the valve coupler. The valve coupler of the disclosed positioner includes a coupler shaft that is rotationally coupled to the stem of the associated valve, so that the coupler shaft is rotated as the stem is actuated. A magnet fixed to a distal end of the coupler shaft is located proximal to a wall of the enclosure, so rotation of the magnet by the shaft can be detected by a magnetic field sensor located on an opposing side of the enclosure wall.

The valve positioner is able to incorporate a clutch and anti-backlash feature by concentrically arranging a torsion spring around the valve coupler, and a cylindrical clutch ring around the torsion spring. A first end of the torsion spring is fixed to the coupler shaft, while the second end of the torsion spring is fixed to the clutch ring, and thereby frictionally coupled to the surrounding housing. The clutch ring is pressed upward or downward by at least one longitudinal spring, which can be a short but otherwise conventional compression spring, or a wave spring. Rotation of the clutch thereby results in a frictional force between the clutch ring and the coupler housing. The clutch thereby allows the tensioning of the spring to be adjusted for any desired positioning of the valve coupler, so as to suppress rotational backlash, vibration, and chatter of the coupler shaft. Due to the magnetic coupling, there is no need for alignment between the valve coupler and the interface sensor.

In embodiments, the compact design of the disclosed valve coupler allows it to be used in place of a legacy positioner without extending outside of the space that was previously occupied by the legacy positioner.

In some embodiments, the torsion spring is a spirally-wound band spring, referred to herein as a "clock" spring, whereby the first end is the inner end of the spiral and the second end is the outer end of the spiral. In other embodiments, the torsion spring is a short but otherwise conventional, helical torsion spring.

In some of these embodiments, the clutch ring includes a circumferential slot or notch into which a key is inserted, wherein the key is fixed to and extends from the coupler shaft. The key and slot thereby limit a rotational range of movement of the coupler shaft relative to the clutch, whereby the range can be adjusted and calibrated via rotation of the clutch relative to the coupler housing.

The present invention is a valve positioner that includes an electronic interface contained within a sealed interface enclosure, a coupler shaft that is rotatable about a vertical axis thereof, the coupler shaft having a distal end that is proximal to the interface enclosure but separated from an interior of the interface enclosure by a separating wall of the interface enclosure, a clutch ring concentric with and surrounding the coupler shaft said clutch ring being in physical contact with and frictionally coupled to a fixed surface that is immediately above or below the clutch ring, a torsion spring surrounding and concentric with the coupler shaft, and surrounded by and concentric with the clutch ring, the torsion spring having a first end fixed to the coupler shaft and a second end fixed to the clutch ring, said torsion spring being configured to apply a torque to the coupler shaft, a magnet fixed to the distal end of the coupler shaft and located adjacent to the separating wall of the interface enclosure, and a magnet sensor located within the interface enclosure proximal to the separating wall and proximal to the magnet, said magnet sensor being configured to sense at least one of a rotary position and a rotation rate of the magnet, thereby sensing at least one of a rotary position and a rotation rate of the coupler shaft.

In embodiments, the torsion spring is a helical torsion spring.

In any of the above embodiments, the torsion spring can be configured as a spiral, the first end thereof being at the inner end of the spiral and the second end thereof being at the outer end of the spiral. And in some of these embodiments the spiral spring is a spiral band spring.

Any of the above embodiments can further include at least one compression spring configured to apply an axial force to the clutch ring so as to press the clutch ring against the fixed surface. In some of these embodiments, the at least one compression spring includes at least one wave spring. And in either of these embodiments the at least one compression spring can include at least one helical spring.

In any of the above embodiments, the clutch ring can include a notch or slot that extends circumferentially in an arc about a partial circumference of the clutch ring, and wherein the positioner further includes a key extension that is rotationally fixed to the coupler shaft and extends radially into the notch or slot, thereby limiting rotation of the coupler shaft to a rotational range that is determined by an arc angle of the notch or slot, an angular location of the notch or slot about the central axis of the coupler shaft being adjustable by frictional rotation of the clutch ring relative to the fixed surface.

And in any of the above embodiments, the fixed surface can be a horizontal surface included in a housing that surrounds the torsion spring, the magnet, and at least a portion of the coupler shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
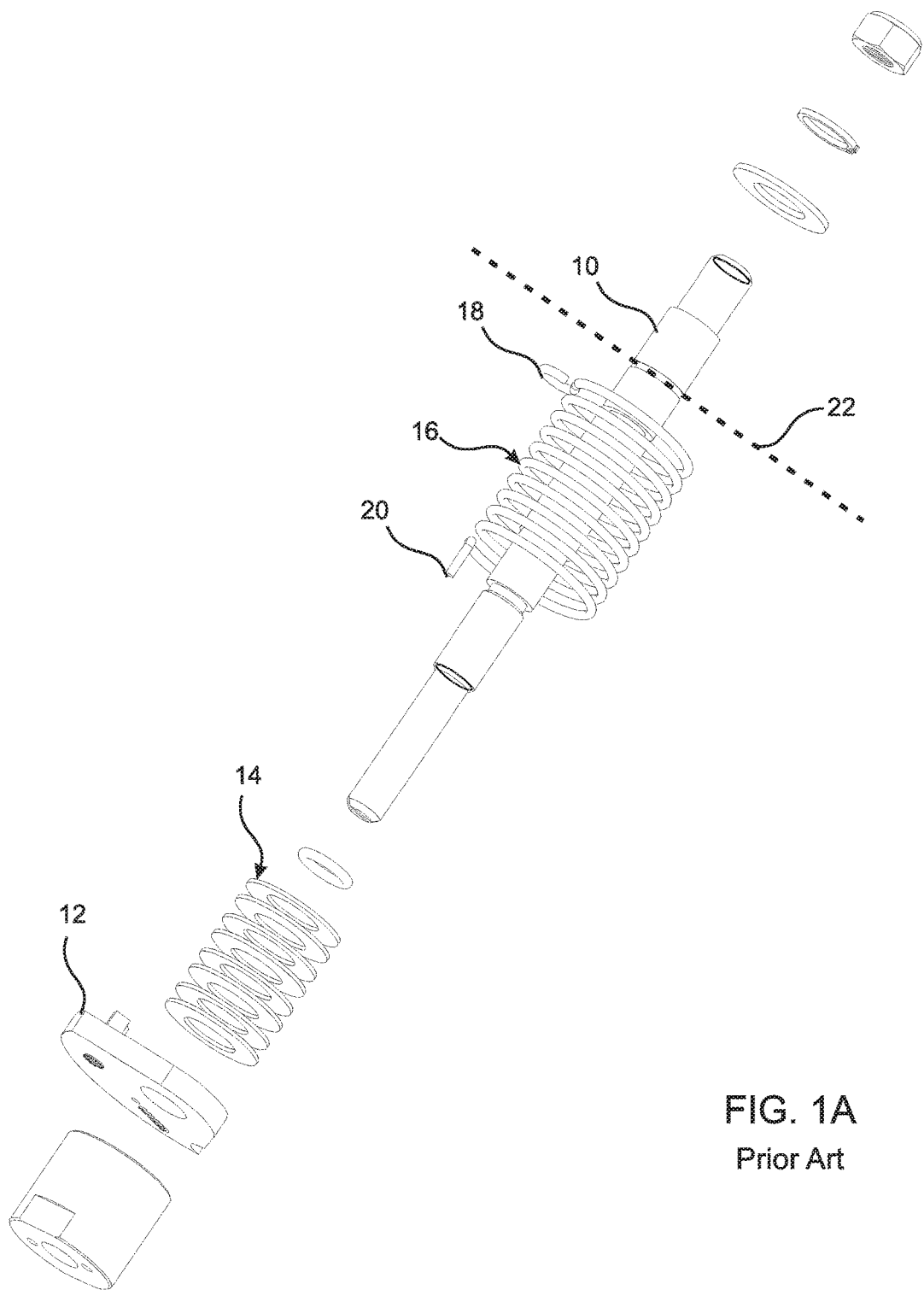
FIG. 1A is an exploded view of a valve coupler of the prior art.
Figure 1B:
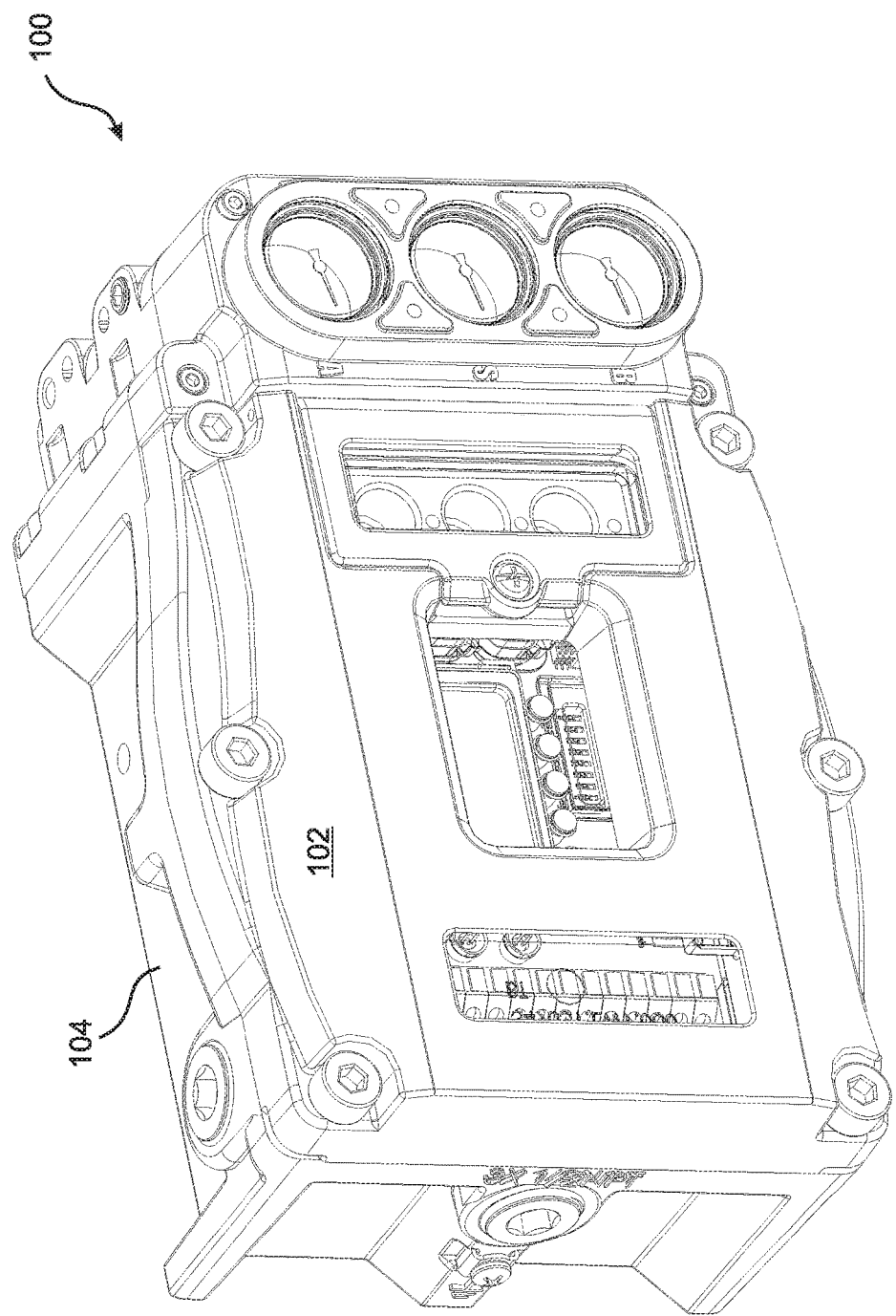
FIG. 1B is a perspective front view of an embodiment of the disclosed valve positioner.
Figure 1C:
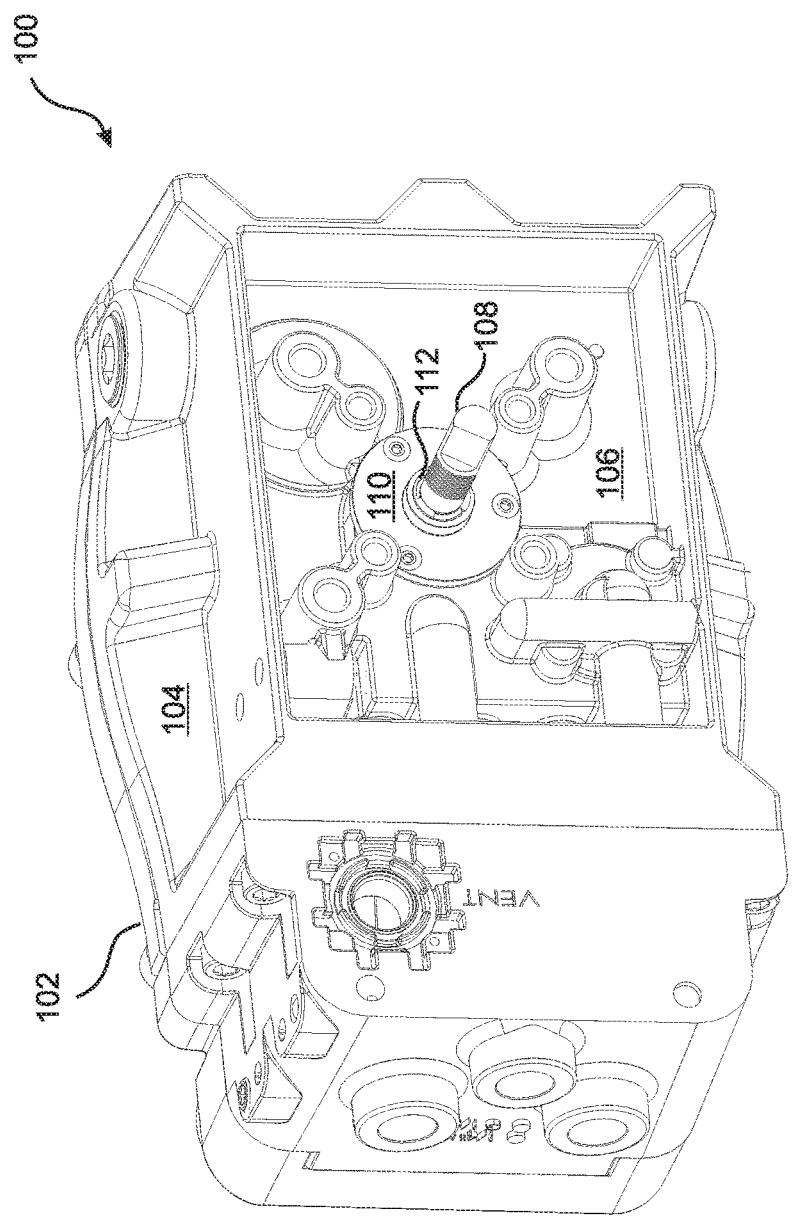
FIG. 1C is a perspective rear view of an embodiment of the disclosed valve positioner.

With reference to FIGS. 1B and 1C, a valve positioner 100 is disclosed that includes an interface contained within a sealed interface enclosure 102 that is adjacent to a front face 104 of a coupler housing 106 that contains a valve coupler. The valve coupler includes a shaft 108 that can be mechanically coupled to a valve stem (see 208 in FIG. 2B) such that the shaft 108 is rotated as the valve stem 208 is actuated. In the embodiment of FIGS. 1A and 1B, the shaft 108 enters the coupler housing 106 through a cover plate 110, and is retained by a retaining ring 112.

Figure 2A:
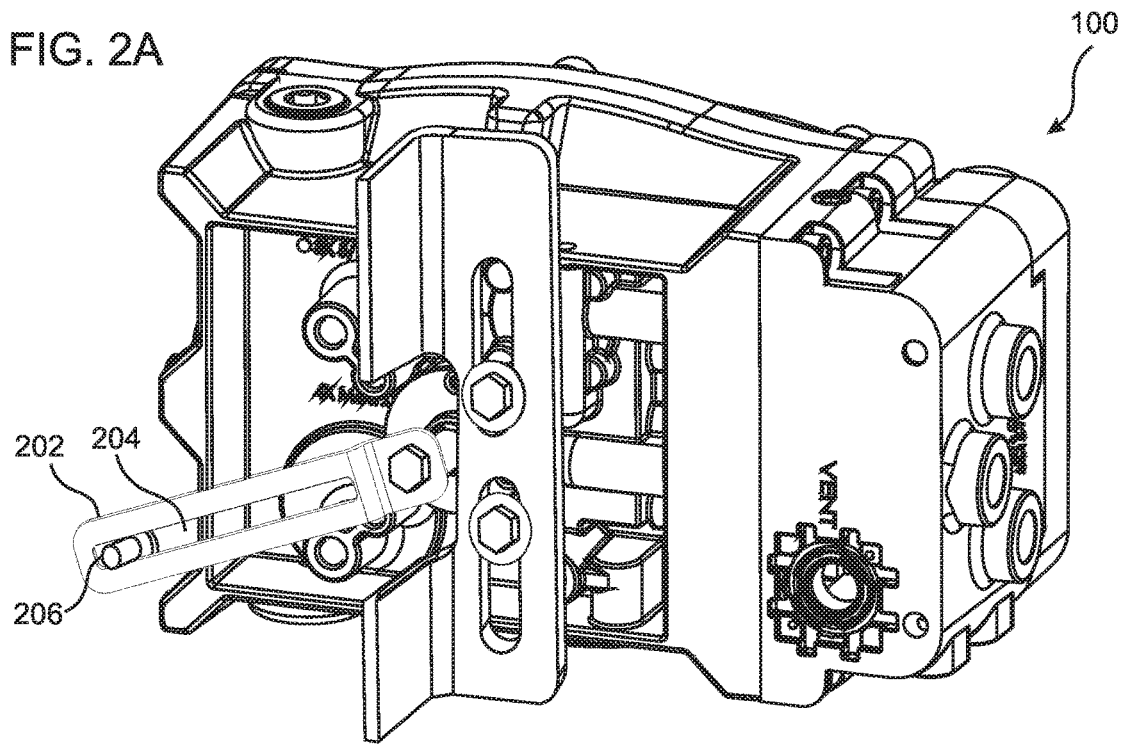
FIG. 2A is a perspective rear view of the positioner of FIG. 1B, showing a mounting bracket and lever arm attached thereto.
Figure 2B:
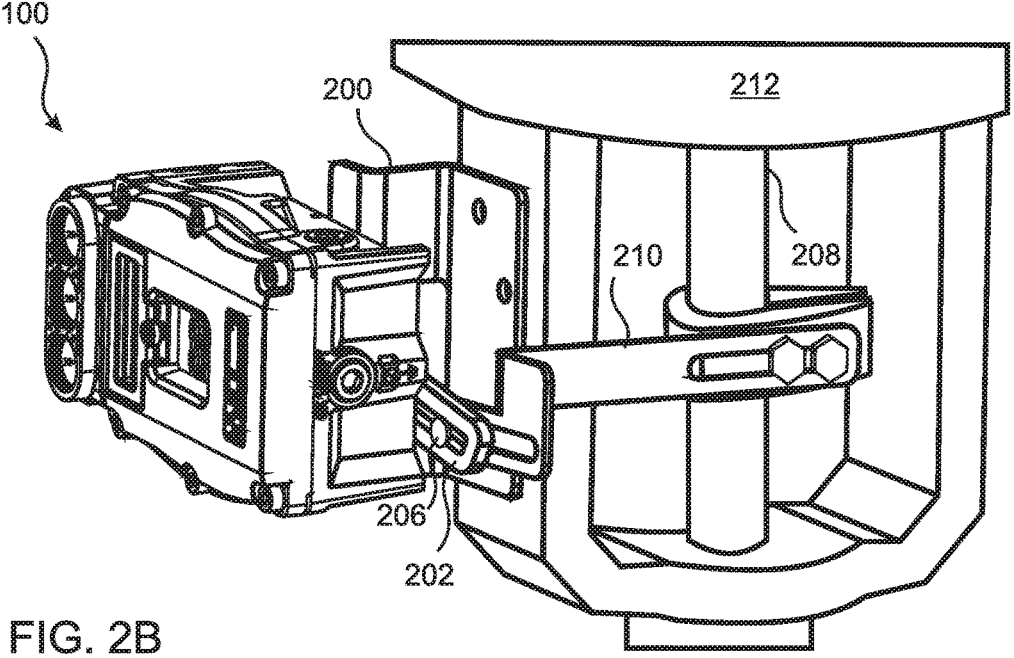
FIG. 2B is a perspective view of the embodiment of FIG. 2A shown attached and coupled to a rotary valve.

FIGS. 2A and 2B present an example of how the coupler shaft 108 in the embodiment 100 of FIGS. 1A and 1B can be mechanically coupled to a valve stem 208. In this example, a mounting bracket 200 is attached to the rear of the positioner 100, and a lever arm 202 is attached to the end of the coupler shaft 108. In this embodiment, the end of the coupler shaft 108 has a flattened side that mates with a correspondingly shaped hole in the lever arm 202, so that the two are rotationally fixed to each other. A pin 206 is inserted in a slot 204 that is provided in the lever arm, such that a lateral movement of the pin 206 results in a rotary movement of the lever arm 202, and hence a rotation of the coupler shaft 108.

FIG. 2B shows the embodiment 100 of FIG. 2A attached to a valve 212 by the mounting bracket 200. In this example, the valve 212 is a rotary valve. The valve stem 208 is attached to a rotary arm 210 that supports the pin 206 at its distal end. As the valve stem 208 is rotated about a vertical axis, the rotary arm 210 is also rotated. However, due to the length of the rotary arm 210, the pin 206 is caused to move in an almost linear fashion in the horizontal plane. This causes the lever arm 202 and the coupler shaft 108 to be rotated about a horizontal axis.

Figure 3:
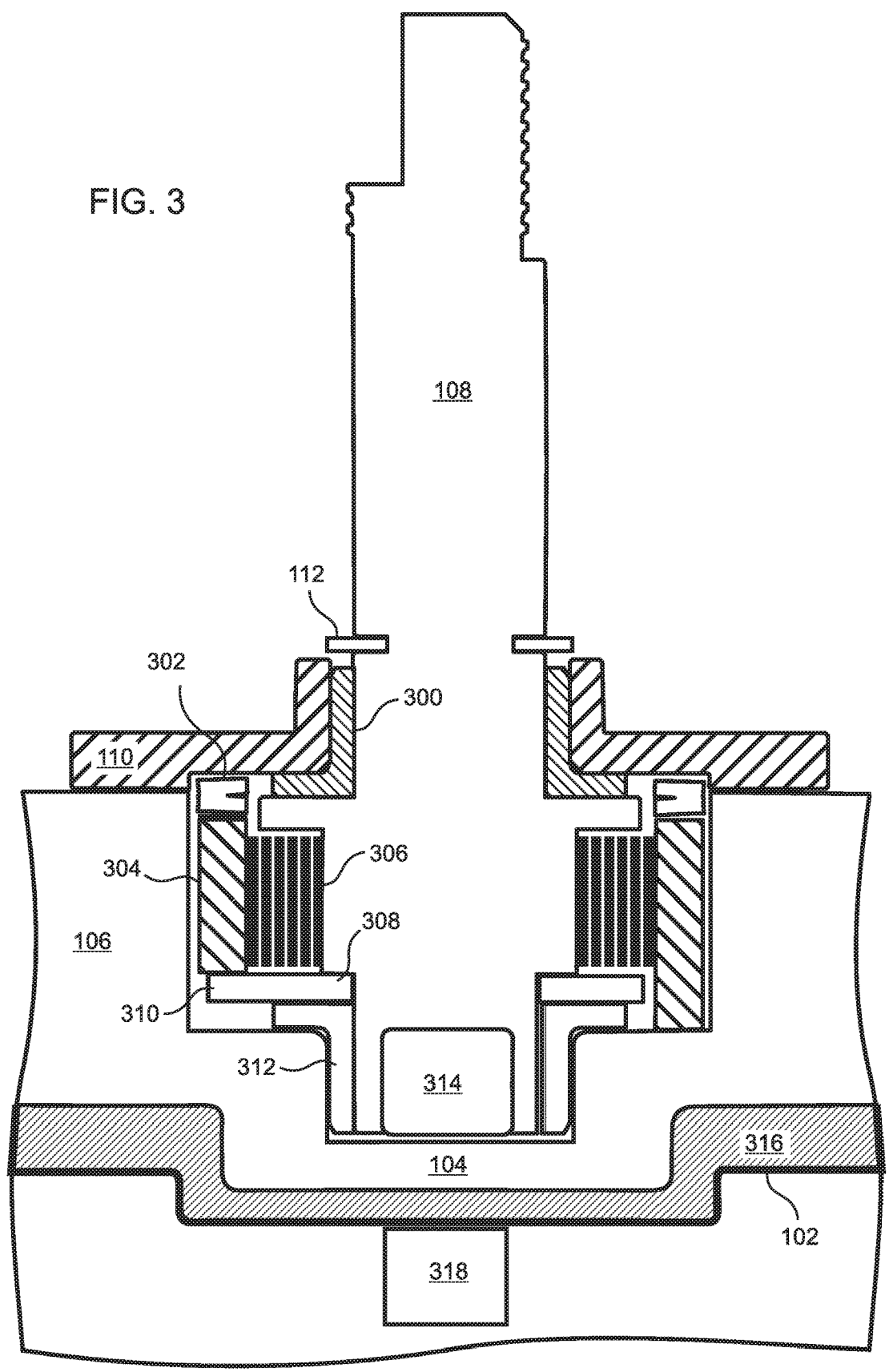
FIG. 3 is a cross-sectional view of the valve coupler portion of the embodiment of FIGS. 1A and 1B.

FIG. 3 is a cross-sectional view of the embodiment 100 FIGS. 1B and 1C. It can be seen from the figure that a bushing 300 surrounds the coupler shaft 108 as it passes through the cover plate 110. A similar bushing 312 supports the coupler shaft 108 at its terminal end within the coupler housing 106.

It can be seen in FIG. 3 that the coupler shaft 108 does not penetrate through the front face 104 of the coupler housing 106 and does not penetrate the interface enclosure 102. Instead, the interface enclosure 102 is sealed by a gasket 316 that is pressed between the interface enclosure 102 and the front face 104 of the coupler housing 104. Accordingly, it is not possible for coupler shaft to be mechanically coupled to a sensing device within the interface enclosure 102. Instead, a magnet 314 is mounted to the distal end of the coupler shaft 108, so as to be positioned close to the front face 104 of the coupler housing 106. Rotations of the coupler shaft 108 are thereby detected by a magnetic field sensor 318 located on an opposing side of the interface enclosure wall.

The disclosed valve coupler 100 is rendered compact by concentrically arranging the anti-backlash torsion spring 306 and the clutch 304 elements of the coupler 100, so that the torsion spring 306 and clutch 304 can be included within a limited volume. In embodiments, the compact design of the valve coupler allows it to be used in place of a legacy positioner without extending beyond space previously occupied by the legacy positioner.

With reference again to FIG. 3, the torsion spring 306 concentrically surrounds the coupler shaft 108, having a first end coupled to the coupler shaft 108 and a second end coupled to the coupler housing 106. The torsion spring 306 maintains a rotational tension on the coupler shaft 108, thereby suppressing mechanical backlash, vibration, and chatter of the coupler shaft 108. In the embodiment of FIG. 3, the torsion spring 306 is a spirally-wound band spring 306, referred to herein as a "clock" spring 306, whereby the first end of the spring 306 is the inner end of the spiral, and the second end of the spring 306 is the outer end of the spiral. In other embodiments, the torsion spring 306 is a short but otherwise conventional, vertical torsion spring 306.

The embodiment of FIG. 3 further includes a clutch ring 304 that concentrically surrounds the torsion spring 306. The clutch ring 304 is pressed downward by a longitudinal spring 302, which is a wave spring in the illustrated embodiment. In similar embodiments the longitudinal spring 302 is a short, but otherwise conventional, compression spring. In similar embodiments, the clutch ring 304 is pressed upward instead of downward. Rotation of the clutch ring 304 thereby results in a frictional force between the clutch ring 304 and the coupler housing 106. In these embodiments, the second end of the torsion spring 306 is fixed to the clutch ring 304, and is thereby coupled by friction to the coupler housing 106.

Figure 4:
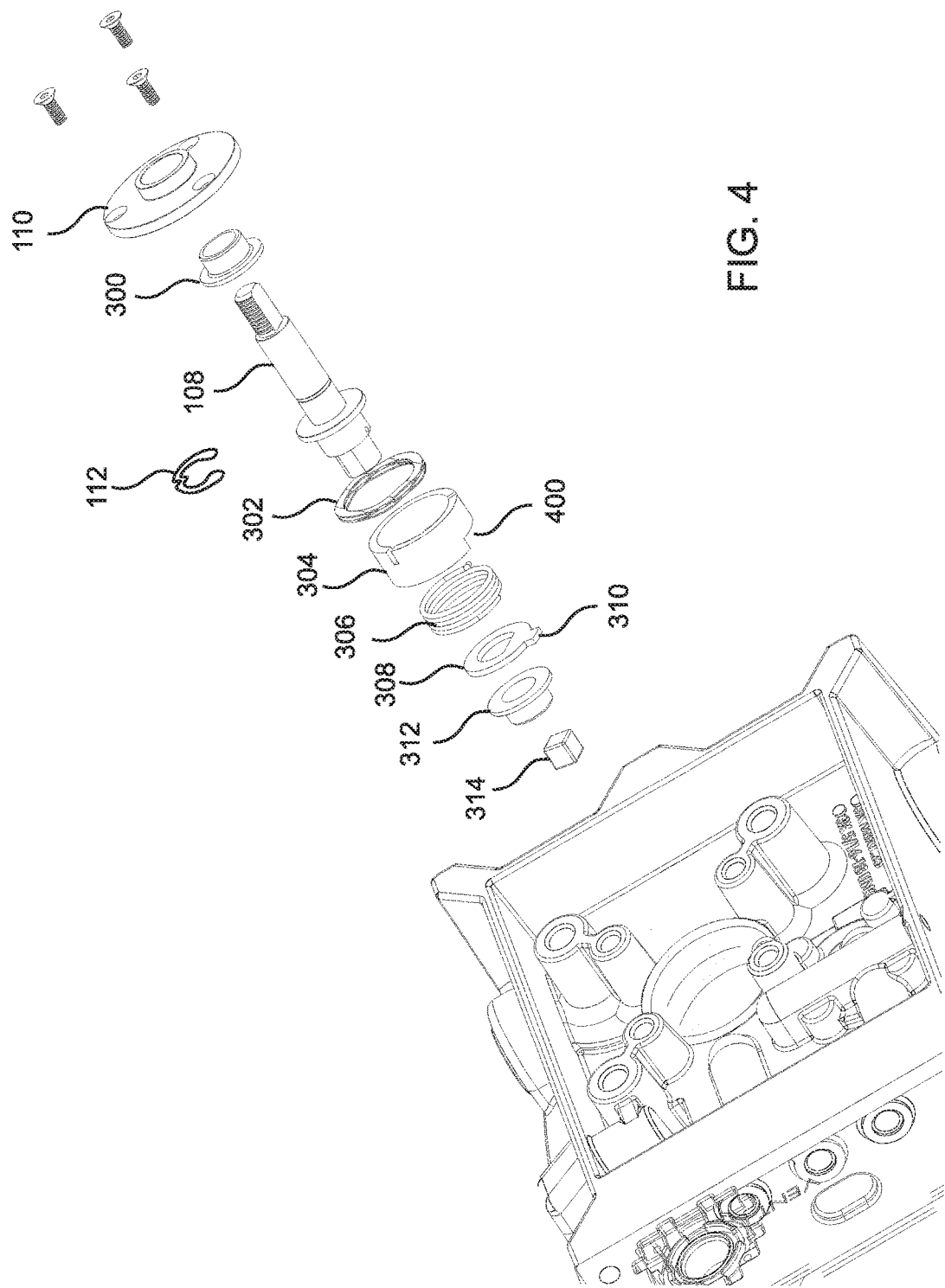
FIG. 4 is an exploded view of the valve coupler of FIG. 3.

An exploded view of an embodiment similar to FIG. 3 is presented in FIG. 4. The difference is that the torsion spring in the embodiment of FIG. 4 is a helical torsion spring instead of a "clock" spring. It can be seen from the figure that the clutch ring 304 includes a circumferential notch 400 into which a key 310 is inserted, wherein the key 310 extends from a clutch washer 308 that is rotationally fixed to the coupler shaft 108. The key 310 and notch 400 thereby limit a rotational range of movement of the coupler shaft 108 relative to the clutch ring 304, whereby the range can be shifted rotationally so as to align it with the attached valve 212 via rotation of the clutch ring 304 relative to the coupler housing 106.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A valve positioner comprising:
   an electronic interface contained within a sealed interface enclosure,
   a coupler shaft that is rotatable about a vertical axis thereof, the coupler shaft having a distal end that is proximal to the interface enclosure but separated from an interior of the interface enclosure by a separating wall of the interface enclosure,
   a clutch ring concentric with and surrounding the coupler shaft said clutch ring being in physical contact with and frictionally coupled to a fixed surface that is immediately above or below the clutch ring,
   a torsion spring surrounding and concentric with the coupler shaft, and surrounded by and concentric with the clutch ring, the torsion spring having a first end fixed to the coupler shaft and a second end fixed to the clutch ring, said torsion spring being configured to apply a torque to the coupler shaft,
   a magnet fixed to the distal end of the coupler shaft and located adjacent to the separating wall of the interface enclosure, and
   a magnet sensor located within the interface enclosure proximal to the separating wall and proximal to the magnet, said magnet sensor being configured to sense at least one of a rotary position and a rotation rate of the magnet, thereby sensing at least one of a rotary position and a rotation rate of the coupler shaft.

2. The positioner of claim 1, wherein the torsion spring is a helical torsion spring.

3. The positioner of claim 1, wherein the torsion spring is configured as a spiral, the first end thereof being at the inner end of the spiral and the second end thereof being at the outer end of the spiral.

4. The positioner of claim 3, wherein the spiral spring is a spiral band spring.

5. The positioner of claim 1, further comprising at least one compression spring configured to apply an axial force to the clutch ring so as to press the clutch ring against the fixed surface.

6. The positioner of claim 5, wherein the at least one compression spring includes at least one wave spring.

7. The positioner of claim 5, wherein the at least one compression spring includes at least one helical spring.

8. The positioner of claim 1, wherein the clutch ring includes a notch or slot that extends circumferentially in an arc about a partial circumference of the clutch ring, and wherein the positioner further includes a key extension that is rotationally fixed to the coupler shaft and extends radially into the notch or slot, thereby limiting rotation of the coupler shaft to a rotational range that is determined by an arc angle of the notch or slot, an angular location of the notch or slot about the central axis of the coupler shaft being adjustable by frictional rotation of the clutch ring relative to the fixed surface.

9. The positioner of claim 1, wherein the fixed surface is a horizontal surface included in a housing that surrounds the torsion spring, the magnet, and at least a portion of the coupler shaft.

* * * * *